United States Patent
Turpin et al.

(10) Patent No.: US 12,306,314 B2
(45) Date of Patent: May 20, 2025

(54) NON-COOPERATIVE POSITION, NAVIGATION, AND TIMING EXTRACTION FROM VSAT COMMUNICATIONS SIGNALS USING MULTI-BEAM PHASED ARRAY ANTENNA

(71) Applicant: All.Space Networks Limited, Reading (GB)

(72) Inventors: Jeremiah P. Turpin, Linthicum, MD (US); Brian Billman, Baltimore, MD (US); John Finney, London (GB)

(73) Assignee: All.Space Networks Limited, Reading (GB)

( * ) Notice: Subject to any disclaimer, the term of this patent is extended or adjusted under 35 U.S.C. 154(b) by 0 days.

(21) Appl. No.: 18/135,520

(22) Filed: Apr. 17, 2023

(65) Prior Publication Data
US 2023/0258820 A1 Aug. 17, 2023

Related U.S. Application Data

(63) Continuation of application No. 16/854,442, filed on Apr. 21, 2020, now Pat. No. 11,681,052.
(Continued)

(51) Int. Cl.
*G01S 19/31* (2010.01)
*G01S 19/25* (2010.01)
(Continued)

(52) U.S. Cl.
CPC .......... *G01S 19/31* (2013.01); *G01S 19/258* (2013.01); *G01S 19/49* (2013.01); *H01Q 3/34* (2013.01)

(58) Field of Classification Search
CPC ........ G01S 19/31; G01S 19/258; G01S 19/49; H01Q 3/34
(Continued)

(56) References Cited

U.S. PATENT DOCUMENTS

| 6,133,870 A | 10/2000 | Wehner |
| 6,327,534 B1 | 12/2001 | Levanon et al. |

(Continued)

FOREIGN PATENT DOCUMENTS

| CN | 106654531 A | 5/2017 |
| GB | 2379110 A | 2/2003 |

(Continued)

OTHER PUBLICATIONS

International Search Report and Written Opinion mailed Apr. 1, 2021 in connection with International Application No. PCT/IB2021/050078.
(Continued)

*Primary Examiner* — Bo Fan
(74) *Attorney, Agent, or Firm* — Wolf, Greenfield & Sacks, P.C.

(57) ABSTRACT

A ground antenna determines the current time and its own position from received signals that were transmitted by artificial earth satellites for communication. A high-gain multi-beam electrically-steered antenna is combined with a processing system to measure the angles between two or more satellites and determine the present distance to each satellite by the information broadcast on the TT&C channel. The knowledge of the angles and distances, as well as the trajectory of the satellites, can be combined with their locations as predicted by the satellite ephemeris data to triangulate the location of the receiver. This system is different from conventional GPS antennas because it does not require the cooperation of active communication with the satellites to derive a location estimate. The location is computed by the ground terminal, not by the satellite. This system can be used in cases where other locating services are offline, jammed, or otherwise unavailable to maintain location and time synchronization.

22 Claims, 6 Drawing Sheets

Related U.S. Application Data

(60) Provisional application No. 62/958,043, filed on Jan. 7, 2020.

(51) Int. Cl.
*G01S 19/49* (2010.01)
*H01Q 3/34* (2006.01)

(58) Field of Classification Search
USPC .......... 342/357.29, 357.43, 357.71; 455/12.1
See application file for complete search history.

(56) References Cited

U.S. PATENT DOCUMENTS

| | | |
|---|---|---|
| 7,116,268 B2 | 10/2006 | Akano |
| 7,148,844 B2 | 12/2006 | Salkhi |
| 7,317,418 B2 | 1/2008 | Salkhi |
| 7,379,707 B2 | 5/2008 | DiFonzo et al. |
| 7,579,987 B2 | 8/2009 | Cohen et al. |
| 7,711,321 B2 | 5/2010 | DiFonzo et al. |
| 8,009,092 B2 | 8/2011 | Abraham et al. |
| 8,032,073 B2 | 10/2011 | Youssefzadeh et al. |
| 8,094,073 B2 | 1/2012 | Nelson et al. |
| 8,106,822 B2 | 1/2012 | Schipper et al. |
| 8,378,890 B2 | 2/2013 | Chopard et al. |
| 8,682,581 B2 | 3/2014 | Psiaki et al. |
| 8,692,712 B2 | 4/2014 | van Diggelen et al. |
| 8,712,322 B2 | 4/2014 | Youssefzadeh et al. |
| 8,749,431 B2 | 6/2014 | Thill et al. |
| 8,766,847 B2 | 7/2014 | Zhao et al. |
| 8,793,033 B2 | 7/2014 | Schuerman |
| 8,862,398 B2 | 10/2014 | De Vries et al. |
| 8,963,764 B1 | 2/2015 | Gray et al. |
| 8,988,284 B2 | 3/2015 | Brucker et al. |
| 9,057,606 B2 | 6/2015 | Wolf et al. |
| 9,083,429 B2 | 7/2015 | Tang et al. |
| 9,083,430 B2 | 7/2015 | Roos et al. |
| 9,121,940 B2 | 9/2015 | Psiaki et al. |
| 9,160,442 B2 | 10/2015 | Roos et al. |
| 9,618,601 B2 | 4/2017 | Aymes et al. |
| 9,638,785 B2 | 5/2017 | Sato et al. |
| 9,810,788 B2 | 11/2017 | Raghupathy et al. |
| 9,945,952 B2 | 4/2018 | Arcidiacono et al. |
| 9,991,946 B2 | 6/2018 | Amundsen |
| 10,054,663 B2 | 8/2018 | Katz |
| 10,222,479 B2 | 3/2019 | Jarvis et al. |
| 10,234,538 B1 | 3/2019 | Fortney |
| 10,243,651 B1 | 3/2019 | Le et al. |
| 10,247,828 B2 | 4/2019 | Riley et al. |
| 10,254,392 B2 | 4/2019 | Reed et al. |
| 10,382,121 B2 | 8/2019 | Roos et al. |
| 10,429,513 B2 | 10/2019 | Yun et al. |
| 10,466,364 B2 | 11/2019 | Rollet |
| 2002/0167441 A1* | 11/2002 | McBurney .......... G01C 21/206 342/357.43 |
| 2005/0260947 A1* | 11/2005 | Karabinis ............ H04B 7/2041 455/12.1 |
| 2005/0280577 A1* | 12/2005 | Feller .................... G01S 19/54 342/357.29 |
| 2015/0002334 A1 | 1/2015 | Lim et al. |
| 2017/0353231 A1 | 12/2017 | Amundsen |
| 2018/0224519 A1 | 8/2018 | Sendonaris et al. |
| 2018/0316089 A1 | 11/2018 | Amaki et al. |
| 2020/0167441 A1 | 5/2020 | Lind et al. |
| 2021/0208286 A1 | 7/2021 | Turpin et al. |

FOREIGN PATENT DOCUMENTS

| | | |
|---|---|---|
| RU | 2010121505 A | 12/2011 |
| RU | 2606958 C1 | 1/2017 |

OTHER PUBLICATIONS

Ardito, et al., Performance Evaluation of Navigation Usmg LEO Satellite Signals With Periodically Transmitted Satellite Positions. Proceedings of the 20H1 International Technical meeting; ION ITM Conference, 2019, 13 pgs.

Jackson et al., Real Time GPS Data Transmission Using VSAT Technology. https://www.researchgate.net/publication/227334284_Real-Time_GPS_Data_Transmission_Using_VSAT_Technology, May 8, 2001; 7 pages.

Bartel, Very Small Aperture Terminal (VSAT) Satellite Communications System. https://kb.nnavco.org/article/very-small-aperture-terminal-vsat-satellite-communications-system-project-historical-346.html. [last accessed Dec. 10, 2019]. Aug. 28, 2010; 2 pages.

* cited by examiner

Figure 1 – Prior Art

NON-COOPERATIVE POSITION, NAVIGATION, AND TIMING EXTRACTION FROM VSAT COMMUNICATIONS SIGNALS USING MULTI-BEAM PHASED ARRAY ANTENNA

CROSS-REFERENCE RELATED APPLICATIONS

The present application is a continuation claiming the benefit under 35 U.S.C. § 120 of U.S. patent application Ser. No. 16/854,442, filed Apr. 21, 2020, and entitled "NON-COOPERATIVE POSITION, NAVIGATION, AND TIMING EXTRACTION FROM VSAT COMMUNICATIONS SIGNALS USING MULTI-BEAM PHASED ARRAY ANTENNA". U.S. patent application Ser. No. 16/854,442 claims the benefit of priority of U.S. Provisional Application No. 62/958,043, filed on Jan. 7, 2020, the contents of both of which are relied upon and incorporated herein by reference in their entirety.

FIELD OF THE INVENTION

The present invention relates to determining the location and time of a receiver based on signals transmitted from a satellite.

BACKGROUND

The Global Positioning System (GPS) and more generally Global Navigation Satellite Systems (GNSS) are in common use for civil and defence purposes worldwide. These systems use constellations of specially designed satellites, generally referred to here as GNSS satellites, to broadcast high precision dedicated GNSS signals. Those dedicated GNSS signals are structured to allow the receiver to obtain straightforward time synchronization, determine distance measurements to the receiver from each satellite in the constellation, and therefore determine the receiver's position on Earth. Such multiple GNSS satellite systems are in operation or planned for operation, including GPS (USA), Galileo (EU), GLONASS (Russia), BeiDou (China), and others. Most of these systems operate in the same or closely separated frequencies of around 1-2 GHz and are intended to interoperate to allow receivers to access multiple networks for greater accuracy and reliability. If one constellation is unavailable, another may still be accessible.

GNSS systems operate in the same fundamental way. Receivers interpret signals transmitted from the satellites to determine the current time based on the GPS system epoch. That time and the structure of the signals are used to determine the distance from each satellite, which is then used to estimate a position. Dedicated GNSS signals transmit signals using CDMA (Code Division Multiple Access) techniques that allows multiple satellites to transmit at the same frequency without interfering with each other. This approach also has a benefit for very low signal-to-noise (SNR) environments, where a very long code can help to improve the SNR through signal correlation, as well as provide positive identification of the signal. The coded signals from the dedicated GNSS satellites are designed to provide precise time calibration as well as include information on the health and status of the satellite and the rest of the constellation (including orbital parameters). A conventional GNSS receiver is shown in FIG. 1, where the antenna 102 of the receiver 101 receives signals simultaneously from a number of GNSS satellites 103, 105 in one or more constellations. The signals 107, 109 from the satellites in each constellation are received by the antenna 102 and are separated and interpreted by the receiver 101 to produce the calculation of time and location of the receiver.

To determine a location, a high accuracy estimate of the current time and the time of flight for the radio signals from three or more satellite locations are necessary to fix a position of the receiver in three dimensions, assuming the current time is already known to high precision. The minimum number of satellites needed to simultaneously determine the current time and the unknown position is four; four measurements (each resulting in an equation) are required to allow solving for the four unknowns—the three position variables x, y, z, and time t. Once the distances and times of the transmission start are determined for each transmitting satellite, the positions of the satellites are then computed based on their known ephemeris and the current time, and the position of the receiver can be computed by trilateration.

Like all wireless communications systems, GNSS transmissions are susceptible to jamming or can even be intentionally disabled by their operators. By operating at similar bands, a jamming signal can affect all the networks simultaneously. By sharing a common architecture and frequency band, the benefits of interoperability come with the disadvantages of multiple networks potentially becoming unavailable at the same time from the same cause.

For this reason, alternate Position, Navigation, and Timing (PNT) systems are desirable as backups to the GNSS systems. Alternates can include the use of high precision local clocks and Inertial Measurement Units (IMUs), terrestrial positioning systems like LORAN (Long Range Navigation), or triangulation from terrestrial cell phone towers. Other than the self-contained IMU approach (which has limited precision and accuracy), these alternates still require support from the greater system and infrastructure, which, as dedicated PNT systems, can be jammed or disabled as well as their satellite systems.

There are many more non-GNSS satellites visible than are available in the dedicated GNSS constellations. Here, non-GNSS satellites indicates any satellites that are broadcasting signals to the ground, but are not part of a dedicated and coordinated satellite system for supporting independent measurements of position and time by ground receivers. Specifically, a non-GNSS satellite is one that does not broadcast signals designed (for example, not limited to: framing structure, encoding, error-correction coding, data message content, frequency band and bandwidth, and power levels) to be used for positioning, and thus ordinarily would not be usable, or is not readily usable, in any way for a ground terminal to perform positioning and timing calculations. With the rise of the Low-Earth Orbit (LEO) mega-constellations of communications and earth observation satellites, the number of non-GNSS satellites in view is increasing rapidly. The positions and trajectories of the non-GNSS satellites are known (although typically not to the same precision of the dedicated GNSS satellites, since that precision is not required for the typical non-GNSS purposes), and if the distance to those non-GNSS satellites can be computed and a time determined, then ground terminals can compute their position without reference to the dedicated GNSS systems.

However, the question of computing distances to the non-GNSS satellites becomes the challenge. The GNSS systems are specifically designed to transmit signals that can be received by small, low-gain, low-efficiency receivers, with signals designed to be demodulated and interpreted from well below the noise floor, and transmit data specifically to support extraction of time and position information.

However, the non-GNSS Satellites are not designed to serve as positioning systems, and therefore operate at different (often much higher) frequencies, transmit different information at varying precisions from which the timing information is less prominent, and require a much higher signal-to-noise ratio at the receiver to demodulate the information transmitted.

Previously, proposals for using non-GNSS satellites for geolocating have relied on active methods from the ground terminal perspective, either by communicating with the satellites to compute a round-trip signal travel time, or to place functionality on the satellite to estimate where on the ground the signal originates and then relay that information back to the ground, or to explicitly bounce radar pulses off of the satellites to measure range and heading. While these methods will suffice for some applications, they do not have the advantages of conventional GNSS approaches. Foremost among these advantages is that the ground receivers are passive, and do not necessarily need to announce their location with a broadcast.

SUMMARY OF THE INVENTION

A ground antenna determines the current time and its own position from received signals that were transmitted by artificial earth satellites for communication. A high-gain multi-beam electrically steered antenna is combined with a processing system to measure the angles between two or more satellites and determine the present distance to each satellite by the information broadcast on the TT&C or other broadcast or communications channel. The knowledge of the angles and distances, as well as the trajectory of the satellites, can be combined with their locations as predicted by the satellite ephemeris data to triangulate the location of the receiver. This system is different from conventional GPS antennas and receivers because it does not require the satellite to broadcast dedicated signals for computing position and time, and differs from other non-GNSS methods of determining position and time because it does not require cooperation and active communication with the satellites to derive a location estimate. The location is computed by the ground terminal, not by the satellite. This system can be used in cases where other locating services are offline, jammed, or otherwise unavailable to maintain location and time synchronization.

DETAILED DESCRIPTION OF THE INVENTION

Figure 1:
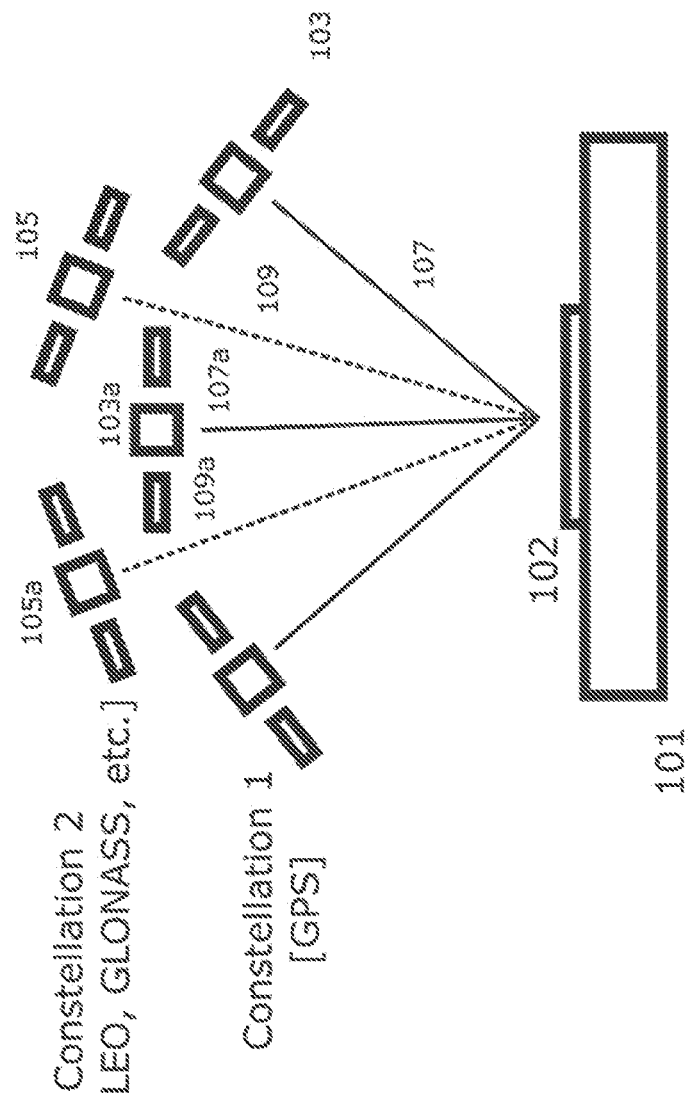
FIG. 1 is a standard GNSS receiver with multiple satellite constellations showing conventional Satellite PNT system.

As noted above, conventional GNSS and GPS systems make use of specially crafted signals in a dedicated frequency band to support and allow for high-precision time and position determination. The present system and method instead allow the determination of position and timing information without support from dedicated signals (as would be readily available from GNSS satellites) from the non-GNSS satellites in different frequency bands than the GNSS systems, and can include information from any transmitting non-GNSS satellite in the operational frequency band of the receiver. The present system relies on simultaneously receiving signals from multiple non-GNSS satellites in different directions relative to the receiver in order to compute the position, which requires a receiver to generate multiple antenna beams to receive the signals. This system operates non-cooperatively because it does not require the non-GNSS satellites to transmit special signals or even be aware that the receiver exists or that the signals are being used for PNT extraction at all. For example, the receiver might simultaneously extract timing synchronization signals transmitted by the beacon or independent TT&C link in the Ka or Ku SATCOM bands from multiple satellites in the same or different LEO communications or earth observation constellations and combine the timing information obtained from those signals with the timing information received from a GEO or MEO satellite to generate a robust time and location estimate. Thus, the non-GNSS satellites can continue to transmit and receive the standard non-GNSS signals, with no operational (or noticeable) differences between when their signals are being used to compute positions, and when they are not. The benefit to this non-cooperative approach is that there is no way for a third party to predict or know which satellites, signals, channels, or frequencies are being used for positioning by a particular end-user. This increases the reliability and availability of the positioning data, since there is no one system that can be jammed, spoofed, or interfered with.

The principles and mathematics behind computing a position for the receiver given estimates of the distances from a set of known locations are well understood. This disclosure allows a new source of the necessary input data (the distances and locations of the source satellites) compared to a conventional GNSS system. Unlike a GNSS receiver that listens with an omnidirectional antenna to a known set of satellites that broadcast specific data to allow determination of position, the present system allows the calculation of distances and locations without support or dedicated signals from the satellite in frequency bands that operate at signal levels that require electrically-large, directive antennas to receive.

The present disclosure relates to a different method of obtaining times, positions, and distances to a distant satellite compared to conventional GNSS systems. This system relies on existing transmitted signals from the non-GNSS satellites, such as the beacon transmissions that are already present on all operating satellites for TT&C purposes. The beacons are narrowband signals modulated with station-keeping and other satellite-health parameters. Beacons are used by the satellite operator to manage the spacecraft, as well as by users of the satellite to help locate and lock onto the satellite for communication purposes.

The biggest limitation with using non-GNSS satellites for passive geolocation is supporting the frequency bands of interest. Only a limited number of non-GNSS satellites operate in the L-band and other low frequency channels, since there is much more bandwidth available at the higher frequencies. However, the higher frequency communication links are generally designed for high-gain directional antennas in order to improve the spectral efficiency of their communication. Path losses and instantaneous bandwidths are larger at the higher frequencies, which requires either higher power to be transmitted from the satellite, larger (and heavier) directional antennas at both the satellite and the ground, or both. Directional antennas indicates the use of electrically large apertures with size substantially larger than a wavelength at the operational frequency, producing gain in the range of 10-70 dBi, and more commonly 15-50 dBi, rather than an omnidirectional antenna (like a conventional GNSS patch antenna) with typically 0-7 dBi gain. Directional ground antennas such as parabolic reflectors can typically only point in one direction at a time and can only listen to one satellite at a time, necessitating many antennas if signals from three or more satellites simultaneously are required.

The present disclosure removes this limitation using either a multi-beam electrically-steered phased array or lens array antenna. With this implementation, a single antenna aperture can generate multiple high-gain receive beams in different directions, simultaneously allowing (for example) a single terminal with a single antenna aperture to passively listen to multiple Ka-band satellites in different parts of the sky at the same time. Only an electrically-steered antenna such as a phased array, digital-beamforming array, liquid-crystal antenna, or lens array antenna is capable of generating multiple independent beams in different, variable directions, which is required for the operation of this system. In addition, since the beams are very narrow in angle, the direction and trajectory of the non-GNSS satellite can be directly measured, something that a conventional GPS receiver using an omnidirectional antenna is not able to do. By locking onto and passively listening to each satellite's respective beacon signal that carries TT&C data, timing information can be extracted. Locking onto the beacon is done in the same way as locking on to a communications satellite transponder, and uses the beam pointing capability of the antenna to track the satellite's location as the satellite or the antenna is in motion.

Passive operation is important in some applications, where strict emissions control is practiced. One of the benefits of conventional GNSS ground systems compared to active location systems like radar or transponders, is that their use is difficult to detect because they do not transmit signals, only receive signals from the GNSS satellites. The present system has the same advantage, unlike cooperative positioning methods using non-GNSS satellites that rely on measuring round-trip communications times (and therefore require transmissions from the receiver).

The non-GNSS satellite positions and trajectories will not be as tightly determined as for dedicated GNSS satellites, nor will the timing or position information on board each satellite that is broadcast as part of the communications or TT&C signals be as precise or synchronized between non-GNSS satellites. This will limit the accuracy that can be obtained. However, in a case where GNSS constellations are jammed or disabled, an alternate method of geolocation is highly valuable, particularly when it can make use of many different satellites. Changing from dozens of GNSS satellites to hundreds or even thousands of non-GNSS satellites that can be used to determine even coarse position information provides a massive increase in overall system reliability and resilience, since it increases the difficulty of jamming or blocking the signals due to the increase in the number of satellites, as well as the increase in the frequency bands and spectrum that must be jammed.

Figure 2:
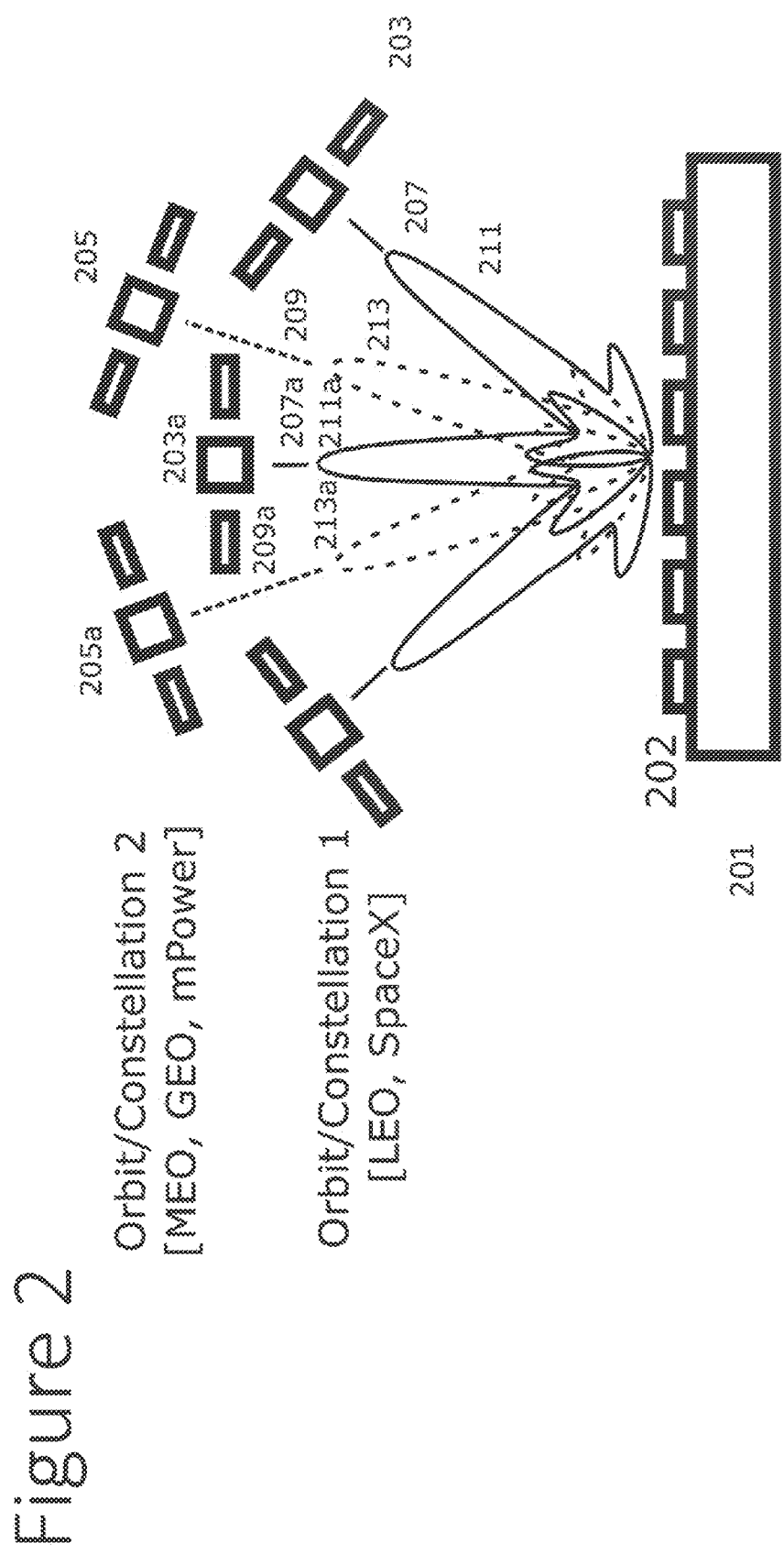
FIG. 2 is a multi-beam high-gain VSAT (Very Small-Aperture Terminal) antenna configured to listen to a signal, such as the Telemetry, Tracking, & Control (TT&C) signals, from multiple satellites at different orbits and constellations in order to allow computation of PNT data by one or more of angular separation between satellites, trajectory of individual satellites, signal time of flight to each satellite, and doppler shift of the signals from each satellite.
Figure 3:
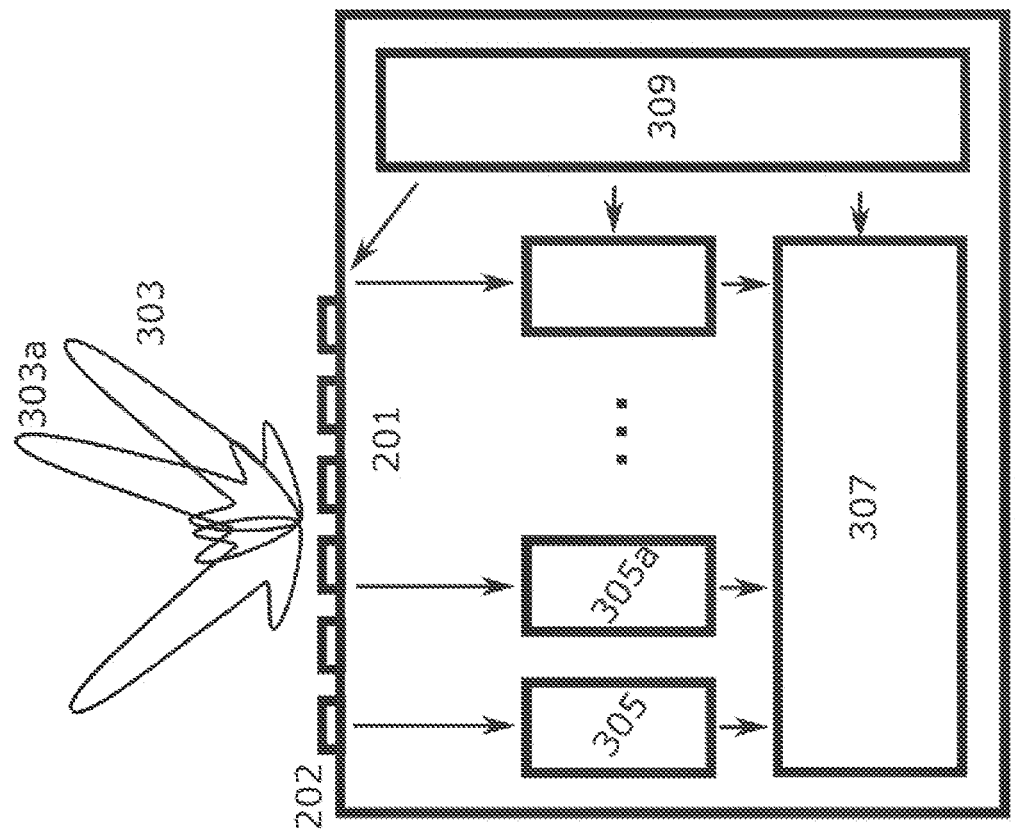
FIG. 3 is a multi-beam high-gain VSAT antenna with a receiver to measure the signals and a computing element to determine the location of the receiver.

Turning to FIGS. 2, 3, the satellite communication system 201 is shown having an antenna 202, receiver 305, signal processor 307, and digital processor 309. The multi-beam electrically-steered antenna 202 can be used to receive signals from (and potentially transmit signals to) multiple non-GNSS satellites 203, 205 at different orbits at once. A receiver 305 is provided for each beam 211, 213, 303 to receive and interpret the signals from the satellite, which will typically be the satellite beacon that contains data from which time and position are determined.

The signal processing apparatus 307 and digital processor 309 control the antenna 202 and compute the location of the receiver based on the content of the received signals. The signal processing apparatus 307 and/or the digital processor 309 can each include a processing device, such as a processor or controller, computer, ASIC, or the like. The signal processing apparatus 307 conditions the signal and converts the waveform into a data stream of information that can then be provided to the digital processor 309, which can be a controller. The processor 309 combines the signals from all of the receivers 305 to determine the position by trilateration, and also monitors the signals to control the pointing direction(s) of the antenna 202. The antenna can be selected to operate at any frequency band where non-GNSS satellites are transmitting, including UHF, L, C, X, Ku, Ka, V, and W bands, but the most value will be at the higher frequencies (X and up, including the common VSAT Ku and Ka bands) where high antenna gain and narrow beam widths are easily achievable. High-gain antennas can receive and interpret low-power signals with reduced error rates. In one illustrative, non-limiting embodiment, the antenna and system operating are described operating at below Ka VSAT frequencies; selecting a VSAT band allows any of the existing communications satellites to be used, and also allows for future communications satellites (such as the LEO networks) to be received. However, the system can be used by any satellite communications or earth observation band where satellites broadcast their TT&C information 207, 209.

The multi-beam antenna is commanded by the controller 309 to seek and locate satellites within the field of view, based either on an estimate of the current time and list of satellite ephemeris that are predicted to be in view, or by a blind search of the sky to locate three or more satellites.

Once three or more non-GNSS satellites are located by the controller 309, and the antenna 202 commanded to steer a beam 303 to each satellite 203, 205, then the receivers 305 receive the beacon transmissions from each satellite and extract the TT&C signals 207, 209. The information carried by the received signals is produced in the receivers 305, further processed and combined in the signal processing system 307 and then passed to the digital processor 309 for analysis and final calculations of position and time. The received data will include timing information and potentially Keplerian elements for the satellite location in addition to the purely internal signals on satellite health of use only to the operator. The time the signals were transmitted from the satellite will be included in the transmission, and the location of the satellite when the signals were transmitted can be inferred based on the satellite identification, the time of transmission, and the ephemeris data obtained either from the transmission itself or an independent almanack.

The current time at the terminal is determined by the processor 309 by jointly considering the information broadcast from all of the connected non-GNSS satellites to compute differences in time of travel among the three or more satellites. With the time-of-flight and the position of the satellites known at the current, known, time, the processor 309 then computes the location of the receiver. The current time, time differences, and positions are computed in accordance with any suitable technique, such as the methods used in GNSS. Once even a rough time is known or estimated, further refinement to the estimated satellite locations can be generated based on the satellite ephemeris data. The accuracy of the location and time measurements will be affected by the accuracy and synchronization between the different non-GNSS satellites, as well as unavoidable variation of the signal timing as the signals propagate through the atmosphere. For example, a LEO constellation might have a health signal transmitted from each satellite that periodically transmits a timestamp and a set of satellite-specific data. The timestamp transmissions would then form the basis of the timing calculations and position calculations.

Increased time accuracy, which will then result in increased position accuracy, can be obtained by including a miniaturized atomic clock or other high precision timing reference signal in the receiver 305 to improve holdover (time accuracy over time) of the current time estimate produced from the received satellite signals. The atomic clock supplements and stabilizes the clock signal derived from the non-GNSS satellite signals, and allows signals to be received from different satellites at different times and still allows integration into the following position and time estimates with a high degree of accuracy.

Figure 5:
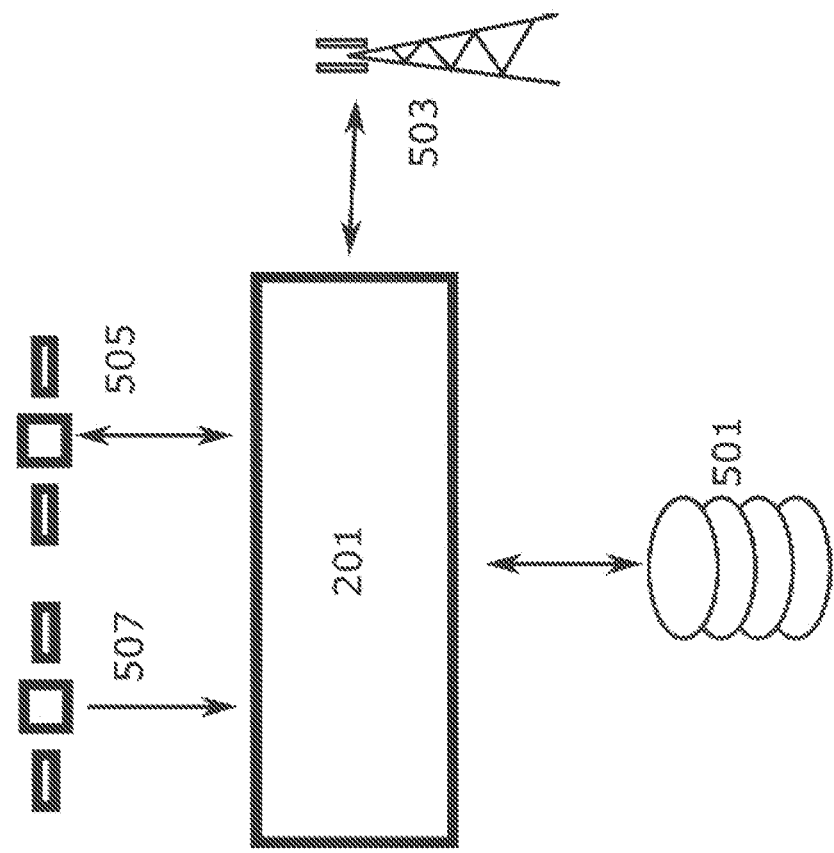
FIG. 5 is the VSAT PNT system configured with one of several possible external communications systems for accessing satellite ephemeris data: a) bidirectional satellite link; b) satellite broadcast; c) terrestrial wireless or wired communications network; or d) stored ephemeris data.

In one embodiment shown in FIG. 5, the system 201 has an almanack or database 501 of ephemeris data of the various satellites that it may use to determine its location, or a method of obtaining such an almanack for all the satellites in the field of view or the subset of satellites for which it has a tracked location. GNSS systems include a mechanism for distributing timely and accurate almanacks of the entire system in a standard way within the navigation signal itself, but non-GNSS communications satellites and systems do not distribute this data or do not do so in a standard manner. Ephemeris data forming an almanack for a non-GNSS systems may be broadcast by the transmitted signal or TT&C link in the form of Keplerian elements or other formats, but will not generally be at the same level of accuracy as provided by the GNSS almanack. The positioning system 201 must know the locations of the GNSS and/or non-GNSS satellites whose signals it is receiving in order to determine its own location.

Satellite ephemeris data change regularly as orbits are perturbed, so a method of regularly obtaining up-to-date almanacks is required. When starting "cold" with no knowledge of the time or position, some information is needed to make the first time and position estimate. The limited number and stable location of the geostationary satellites mean that their orbital data can be stored in the system's 201 memory 501 to allow for an initial position and time fix, even if the data is of limited accuracy. A cooperative, active bidirectional satellite link 505 established with one or more non-GNSS communications satellites would then allow requesting an updated almanack from the internet for ephemeris data for the other non-GNSS satellites that may not exist in the internal database. A cooperative method that preserves the passive nature of the receiver could be used as part of a greater system where a satellite transponder or transponders are configured to continually broadcast the ephemeris data (forming an almanack) for a large number of non-GNSS satellites to allow the positioning system 201 to obtain an accurate almanack without requiring active bidirectional communication.

Alternately, depending on the application and availability, terrestrial communications systems such as a mobile network 503 or wireline connection could be used to obtain almanack information as well. If this system is used in a broader system, then almanack information could also be broadcast by one or more satellites 507 to maintain the benefits of not requiring active broadcasts from the receiver in order to determine location. This would however require support from the satellite side, even if the signals and system were not specially designed for supporting positioning.

Figure 6:
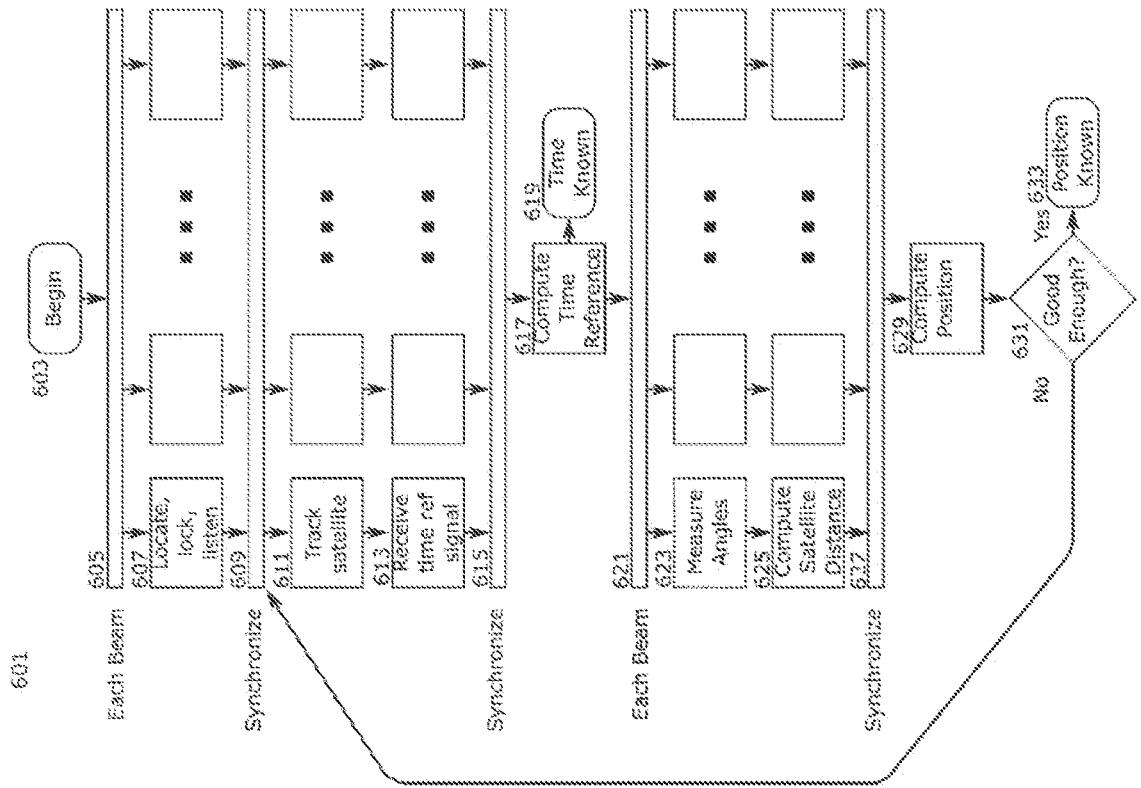
FIG. 6 is a process diagram for the operation of the antenna for computing timing and position data.

The process for determining position and time of the system 201 has several parts. Once the position and time is determined, the system can utilize any suitable analogous algorithm and calculations, such as those used in standard GNSS system. Referring to FIG. 6, operation of the system is shown. On beginning 603 operation, each one of multiple beams 605 are used to locate independent non-GNSS satellites, lock onto the satellites' signals, and listen for signals, step 607. Due to the difference in frequency band between the GNSS and non-GNSS satellites, it is unlikely that both sets of signals can be leveraged to improve the resulting position measurements.

Figure 4:
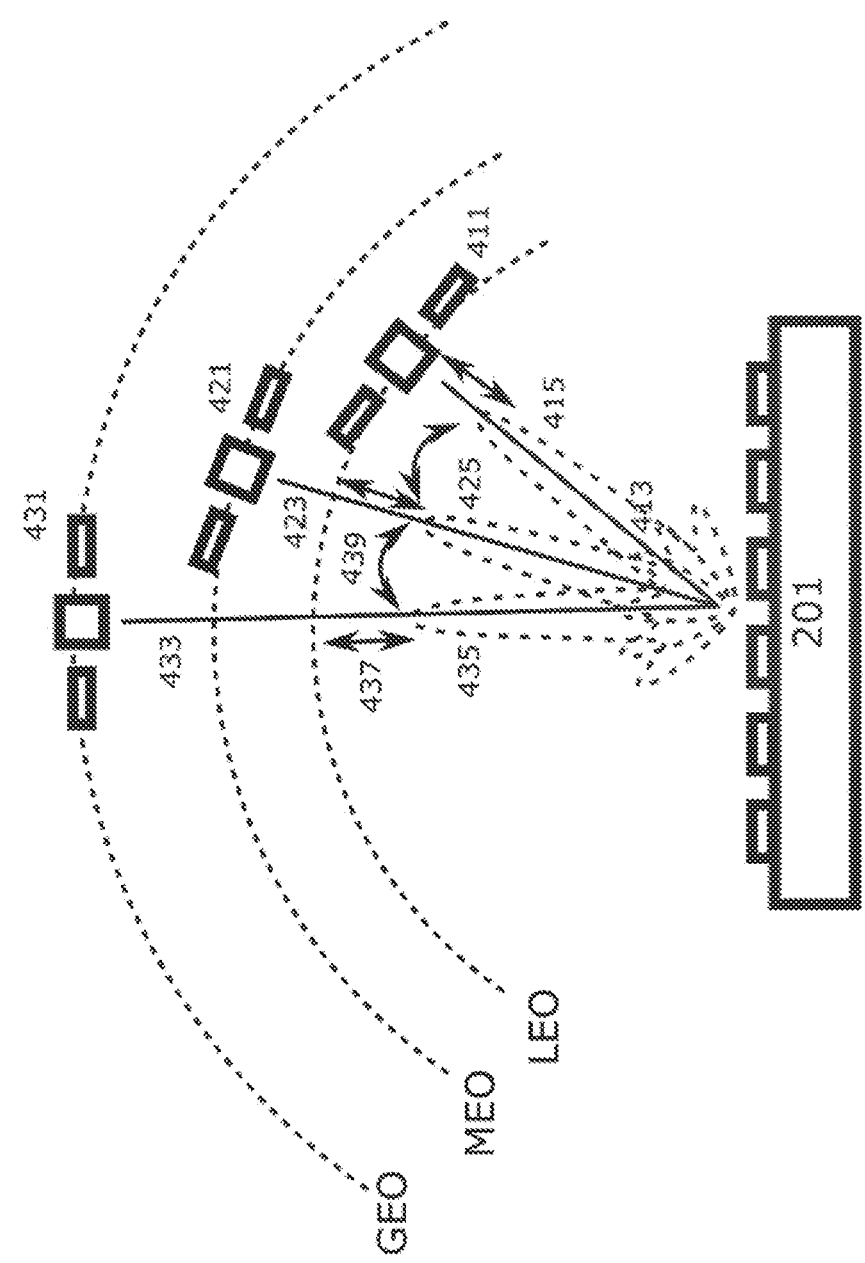
FIG. 4 is an antenna configured to receive a signal, such as the TT&C signals, from each of LEO (Low-Earth Orbit), MEO (Medium-Earth Orbit), and GEO (Geostationary Earth Orbit) satellites.

Referring to FIG. 4, once a plurality of at least three beams have located and locked to a satellite, step 609, each of the beams then tracks 611 the respective satellites over time until they receive 613 signals 413, 423, 433 from the multiple non-GNSS satellites. The current positions of the satellites are computed by the signal processor 307 based on the time and almanack data in the almanack database 501. Once all the signals are available, step 615, the current time 619 is then computed 617. The collected signals from each of the beams 621 received by 607 and 611 are then used to compute the distance 625 to the respective satellites. With all of the distances known, step 627, the position of the system 201 can be computed, step 629, based on the distances 437 between the system 201 and each of the satellites 203, 205 and the known satellite locations by trilateration. If the measure of the position, step 629, is not sufficient, step 631, the process continues with each beam 609 tracking satellites 611 to receive their signals 613. If the measure of the position, step 629, is sufficient, step 631, then the position is known, step 633. The user using the system can then use that position to replace the information from an unavailable GNSS system, for example.

An alternate method is to make use of the time information and current location of the satellites, as well as to optionally measure 623 the angles 439 between the satellites as seen by the ground terminal. The angles 439 are derived from the beam locations, which are known by the terminal as it tracks the target satellites. Since the multi-beam antenna would be tracking each satellite with an independent beam, the angle of each beam 415, 425, 435 determines the direction to each satellite 411, 421, 431. By measuring three or more angles, the position of the receiver can be determined by triangulation.

Satellites not in a Geostationary orbit move with respect to the ground. This relative movement can be tracked from the ground by monitoring the position, distance, and received angle to one or more Non-GeoStationary Orbit (NGSO) satellites 411, 421 over time. In this way, the perceived trajectory of the satellites is measured by the system 201 and can be compared with the expected trajectory from the ephemeris data; this additional information can be used to improve the accuracy of the position estimates. This method can be used while the system 201 is either stationary or has local movement cancelled out in the calculations using an inertial motion unit (IMU), which includes accelerometer and gyroscope sensors and performs dead-reckoning to track the location of the unit without access to outside references. Locally tracking the relative motion and position of the system 201 with an IMU allows signals received at different times to be integrated into the overall position estimate using processing methods such as Kalman filtering, and ultimately allows greater accuracy of both time and position than could be obtained without the use of the IMU.

Doppler information from the frequency of received narrowband signals throughout the pass, which includes the beacon and TT&C links, can also provide tighter estimates of trajectory. For example, the rate of change of frequency of the beacon and TT&C signal can be used to estimate the midpoint of the pass and time when the satellite makes its closest approach, which can help to tighten estimates of time and line up current position measurements with reported ephemeris data. Including velocity or trajectory from the doppler shift as well as the time of flight and direction of arrival information in the calculations of position improves estimates since the doppler shift is less subject to noise and errors than the timing signals themselves, and large apparent motion between position measurements can be checked with the velocity information to confirm that the apparent motion is correct. This trajectory over time can be compared with the almanack data and used to improve the accuracy of the local position calculations, since more information is then available (velocity and trajectory vectors) in combination with the known or constrained orbital mechanics of the satellite.

Ultimately, the position of the system 201 will be computed with more accuracy by combining the calculations based on distance from the satellites, angle from the receiver to the satellites, and the measured trajectory of the satellites, all combined with the current time and satellite orbital parameters as contained in the ephemeris data or almanack.

No matter which method or combination of methods are used to compute position, the uncertainty and error estimates of each measurement can be combined to estimate the resulting accuracy or error in the position estimate itself.

The orbit of the satellites used in this method is immaterial, as long as the orbital parameters can be obtained. Satellites all on the equatorial plane, even though they are on a single plane, can be used for position estimates away from the equator (since from the equator they will appear to be a line); this allows the use of GEO satellites or MEO equatorial satellites. Satellites with inclined orbits at MEO and LEO offer some benefits that there will always be satellites passing nearly overhead, but the satellites will also be moving rapidly and will be more challenging to lock onto in the first place. The present system will function for any single or combination of orbits but will yield the most robust information and accuracy estimates when a combination of orbits and inclinations and satellite locations are used.

In summary, the present disclosure is for a method and system for computing the current time and distance from a plurality of satellites as the input to a computing device (such as a processing device, e.g., controller or processor) that uses that information to determine the position of the receiver. What separates this system from GPS and existing GNSS and other positioning systems is that a multibeam, directive antenna (such as an antenna suitable for VSAT operation) is used to receive signals from satellites (such as Ku- and Ka-band data communications or TV broadcast satellites) that are too weak (and in a different frequency band) to be received by an omnidirectional GNSS or other or low-gain antenna. With the multibeam, directive antenna, the present system can extract positioning data from signals and satellites that cannot ordinarily be used or are not readily usable (e.g., by a GPS or GNSS system).

The only way that an antenna can have multiple independently-steerable directive beams that can independently track satellites is electrically-steerable antennas. In contrast, mechanically-steered antennas can point in one direction at a time, and would need multiple antennas to perform the same action as a single multibeam antenna is able to perform. Potential timing references in existing satellite signals can include framing structure in communications and broadcast signals, synchronisation signals between satellites and controllers, or satellite health broadcasts and TT&C links. By receiving these signals (which cannot be received by existing GNSS and positioning systems), the receiver can extract the timing information and compute the distance and locations of the satellites, and then derive from that the position of the receiver.

Unlike positioning systems that make use of communications satellites, the present system does not rely on any particular signals to be available from the satellite, but will work with whatever signals are ordinarily being transmitted, i.e., the non-GNSS satellites are non-cooperative. In particular, the satellites used for positioning need not have any knowledge that their signals are being used for the purpose of positioning. The system does not use satellite-assisted positioning, where the round-trip signal time when actively communicating with a satellite is used to derive timing information, or the case where the satellite (or satellite constellation) is used to determine the position of the transmitter on the ground and communicate the position back to the receiver.

Any frequency band can be used, and the most flexible system would be when the antenna and system can operate at and listen to different frequency bands. However, electrically-steered antennas that operate at multiple frequencies are difficult to build and are expensive. So, most practical systems will operate at a single band, with the most common communications systems bands being Ka and Ku for VSAT operation.

Numerous applications of the present system and method will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A satellite communication system, comprising:
   a multi-beam antenna configured to receive different satellite transmissions from different directions simultaneously via different beams; and
   one or more processors configured to:
     direct the multi-beam antenna to track three or more non-global navigation satellite system (GNSS) satellites whose transmissions are signals lacking location and time data;
     determine time based on one or more of the three or more non-GNSS satellites; and
     determine a location of the satellite communication system based on location information determined from the signals from each of at least three of the three or more non-GNSS satellites.

2. The satellite communication system according to claim 1, wherein the one or more processors is configured to determine an angle from the satellite communication system to each of the at least three of the three or more non-GNSS satellites as the location information.

3. The satellite communication system according to claim 2, wherein the one or more processors is configured to determine the location of the satellite communication system based on the location information and triangulation.

4. The satellite communication system according to claim 1, wherein the one or more processors is configured to determine a distance from the satellite communication system to each of the at least three of the three or more non-GNSS satellites as the location information.

5. The satellite communication system according to claim 4, wherein the one or more processors is configured to determine the distance to the at least three of the three or more non-GNSS satellites based on the signals and on trajectory information for the at least three of the three or more non-GNSS satellites.

6. The satellite communication system according to claim 1, wherein one or more of the one or more processors is configured to obtain ephemeris data indicating a provided trajectory for the one or more of the three or more non-GNSS satellites.

7. The satellite communication system according to claim 6, wherein the one or more processors is configured to determine an estimated trajectory for the one or more of the three or more non-GNSS satellites based on a frequency shift in the signals from the one or more of the three or more non-GNSS satellites.

8. The satellite communication system according to claim 7, wherein the one or more processors is configured to improve an estimate of the time and the location of the satellite communication system based on comparing the provided trajectory with the estimated trajectory for the one or more of the three or more non-GNSS satellites.

9. The satellite communication system according to claim 6, wherein the ephemeris data is updated via communication with one of the three or more non-GNSS satellites.

10. The satellite communication system according to claim 9, wherein the one of the three or more non-GNSS satellites is not one of the one or more of the three or more non-GNSS satellites used to obtain the time.

11. The satellite communication system according to claim 9, wherein the ephemeris data is updated via terrestrial communication by the satellite communication system.

12. The satellite communication system according to claim 1, wherein the satellite communication system is non-stationary, and the satellite communication system further comprises an inertial measurement unit (IMU) to locally track relative motion and position of the system.

13. The satellite communication system according to claim 12, wherein one or more of the one or more processors is configured to integrate the relative motion and position of the satellite communication system obtained from the IMU into a determination of the location of the satellite communication system.

14. The satellite communication system according to claim 1, wherein one or more of the one or more processors is configured to provide the location of the satellite communication system to a device that relies on but cannot obtain GNSS-based location.

15. A controller of a satellite communication system, comprising:
a memory configured to store orbital data for one or more non-global navigation satellite system (GNSS) satellites whose transmissions are signals lacking location and time data; and
a processor configured to:
command a multi-beam antenna to track three or more non-GNSS satellites;
determine time based on one or more of the three or more non-GNSS satellites; and
determine a location of the satellite communication system based on location information determined from the signals from each of at least three of the three or more non-GNSS satellites.

16. The controller according to claim 15, wherein the processor is configured to determine an angle from the satellite communication system to each of the at least three or more non-GNSS satellites as the location information.

17. The controller according to claim 16, wherein the processor is configured to determine the location of the satellite communication system based on the location information and triangulation.

18. The controller according to claim 15, wherein the processor is configured to determine a distance from the satellite communication system to each of the at least three of the three or more non-GNSS satellites as the location information and to determine the distance to the at least three of the three or more non-GNSS satellites based on the signals and on trajectory information for the at least three of the three or more non-GNSS satellites.

19. The controller according to claim 15, wherein the processor is further configured to obtain ephemeris data indicating a provided trajectory for the one or more of the three or more of the non-GNSS satellites.

20. The controller according to claim 19, wherein the processor is configured to determine an estimated trajectory for the one or more of the three or more of the non-GNSS satellites based on a frequency shift in the signals from the one or more of the three or more of the non-GNSS satellites.

21. The controller according to claim 20, wherein the processor is configured to improve an estimate of the time and the location of the satellite communication system based on comparing the provided trajectory with the estimated trajectory for the one or more of the three or more of the non-GNSS satellites.

22. The controller according to claim 19, wherein the processor is configured to update the ephemeris data based on communication with one of the three or more of the non-GNSS satellites.

* * * * *